United States Patent
Ayub et al.

(10) Patent No.: US 12,549,671 B2
(45) Date of Patent: Feb. 10, 2026

(54) SYSTEM AND METHOD OF DETERRING UNSOLICITED TELEPHONE CALLS

(71) Applicant: Hamid Ayub, Plantation, FL (US)

(72) Inventors: Hamid Ayub, Plantation, FL (US);
Alina Ayub, Plantation, FL (US);
Kashif Ayub, Plantation, FL (US)

(*) Notice: Subject to any disclaimer, the term of this patent is extended or adjusted under 35 U.S.C. 154(b) by 0 days.

(21) Appl. No.: 19/324,410

(22) Filed: Sep. 10, 2025

(65) Prior Publication Data
US 2025/0385971 A1    Dec. 18, 2025

Related U.S. Application Data

(63) Continuation-in-part of application No. 18/241,877, filed on Sep. 3, 2023, now abandoned.

(51) Int. Cl.
*H04M 15/10* (2006.01)
*H04M 3/42* (2006.01)
*H04M 15/00* (2024.01)

(52) U.S. Cl.
CPC ....... *H04M 15/10* (2013.01); *H04M 3/42059* (2013.01); *H04M 15/73* (2013.01); *H04M 2203/6027* (2013.01); *H04M 2215/0108* (2013.01); *H04M 2215/7072* (2013.01)

(58) Field of Classification Search
CPC .. H04M 15/10; H04M 3/42059; H04M 15/73; H04M 2203/6027; H04M 2215/0108; H04M 2215/7072
See application file for complete search history.

(56) References Cited

U.S. PATENT DOCUMENTS

| | | | |
|---|---|---|---|
| 6,353,663 B1* | 3/2002 | Stevens | H04M 15/68 455/406 |
| 9,426,288 B2* | 8/2016 | Farrand | H04M 3/42059 |
| 9,692,891 B1* | 6/2017 | Kirchhoff | H04W 4/16 |
| 10,070,282 B2* | 9/2018 | Joels | H04M 3/42136 |
| 10,097,688 B2* | 10/2018 | Cook | H04M 3/42068 |
| 12,003,667 B2* | 6/2024 | Meredith | H04M 3/4365 |
| 12,407,775 B2* | 9/2025 | Nowicki | H04M 3/42059 |
| 2024/0314238 A1* | 9/2024 | Ives | H04M 3/4365 |

* cited by examiner

*Primary Examiner* — Lisa Hashem

(57) ABSTRACT

Disclosed herein is a call processing system for controlling unsolicited telephone calls in a telecommunications network. The system includes at least one processor configured to receive a call request from an originating telephone number, determine that the number is not present in a contact list of a called-party device, and transmit a pre-connection notification indicating that completion of the call may be subject to a charge. Upon acceptance of the potential charge, the processor connects the call and provisionally authorizes the charge. After call termination, the processor triggers presentation of a prompt on the called-party device requesting an instruction to confirm or waive the charge. The processor then processes the charge in accordance with the instruction, finalizing or voiding the charge. The system may maintain a repeat-offender database, apply penalty escalation, support timeout and SIM verification, and enable adaptive bypass for trusted callers.

17 Claims, 2 Drawing Sheets

SYSTEM AND METHOD OF DETERRING UNSOLICITED TELEPHONE CALLS

CROSS-REFERENCE TO RELATED APPLICATION

This application is a Continuation-in-Part (CIP) of U.S. patent application Ser. No. 18/241,877 filed on Sep. 3, 2023, the disclosure of which is hereby incorporated by reference in its entirety in this application.

TECHNICAL FIELD

The present disclosure relates in general to tools and techniques for deterring or discourage unsolicited telephone calls, particularly to methods and apparatus for managing fraudulent calls by charging the calling party by the user

BACKGROUND

With development of telephone communications, the number of parties offering services via telephone has increased. Telephone calls from these parties, such as telemarketers, pollsters, and charitable organizations, sometimes referred to as spam calls, robocalls, or junk calls, are typically unsolicited, placed in bulk and made indiscriminately. Telemarketers employ increasingly sophisticated technology to get their calls through to their target audience despite people's desire to be left alone. Furthermore, telemarketers can employ computers to dial a number until the call is answered, so they can automatically transfer the call to a human agent. This can be heard as a pause after the phone call is answered but before the called party can speak to the human agent.

In some cases, auto-diallers or robo-callers might be used to initiate such unsolicited calls (which might include voice calls or text messages, or both) in an automated manner (either sequentially and/or in a random fashion).

For any person, receiving an unsolicited call can be an annoyance and a frustration, especially if the recipient of the unsolicited call had previously indicated to the caller that he or she does not wish to receive future calls from the caller and/or if the recipient had previously put the telephone number of the unsolicited caller on a no-call list.

Existing methods for protecting the consumers against such unsolicited calls include call screening, anonymous call blocking, and caller compliance with a national "Do Not Call" list. Consumers can employ a variety of defences against undesired callers. Some telephone services can allow anonymous call reject so that the phone does not ring if the caller Identification (ID) is blocked.

Some privacy protection techniques can employ a "whitelist" of known acceptable callers and a "blacklist" of known undesired callers. However, blocking only blacklisted numbers often lets too many "junk" calls through due to the blacklist being incomplete, while allowing only calls from whitelisted numbers may be too restrictive. Moreover, managing blacklists and whitelists manually can be bothersome and often can be cumbersome.

Furthermore, such methods may not deter persistent unsolicited callers. Such callers may simply ignore Do Not Call lists, use a bank of phones having different telephone numbers from which to make unsolicited calls, employ non-anonymous caller ID names, and/or target other average people, who might not utilize any of these protective methods.

In light of the above-mentioned problems associated with existing methods for deterring spam calls, a method and system is presented as a solution to deter unwanted spam calls while allowing dynamic waiver of charges by the called party.

SUMMARY

Embodiments of the present disclosure present technological improvements as solutions to one or more of the above-mentioned technical problems recognized by the inventor in conventional solutions.

The present invention relates to systems and methods for controlling unsolicited telephone calls in a telecommunications network by introducing a post-call charging confirmation mechanism. In contrast to prior systems that require the calling party to pre-authorize charges, the invention allows a called party to confirm or waive a provisionally authorized charge after a call has ended. This provides greater control to the recipient of unsolicited calls and establishes a stronger deterrent for persistent unwanted callers.

In one embodiment, a call processing system includes at least one processor and a memory storing instructions that enable the processor to identify calls from numbers not stored in a called party's contact list, transmit a pre-connection notification to the calling party, provisionally authorize a charge upon acceptance by the calling party, and connect the call. After termination of the call, the processor triggers a prompt on the called-party device requesting an instruction to confirm or waive the charge and processes the provisionally authorized charge in accordance with the instruction.

OBJECT OF THE INVENTION

An object of the present invention is to reduce nuisance and spam calls by requiring callers from unknown numbers to accept a potential charge before call completion.

Another object of the present invention is deter repeat offenders by maintaining a database of prior call outcomes and applying escalating penalties or restrictions to callers who frequently generate waived or charged calls.

BRIEF DESCRIPTION OF DRAWINGS

The summary above, as well as the following description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

It will be appreciated that the drawings illustrated herein are for representation purposes only and do not intend to limit the scope of the present disclosure, and actual implementation of the present disclosure may be viewed substantially differently.

DESCRIPTION OF EMBODIMENTS

The following description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
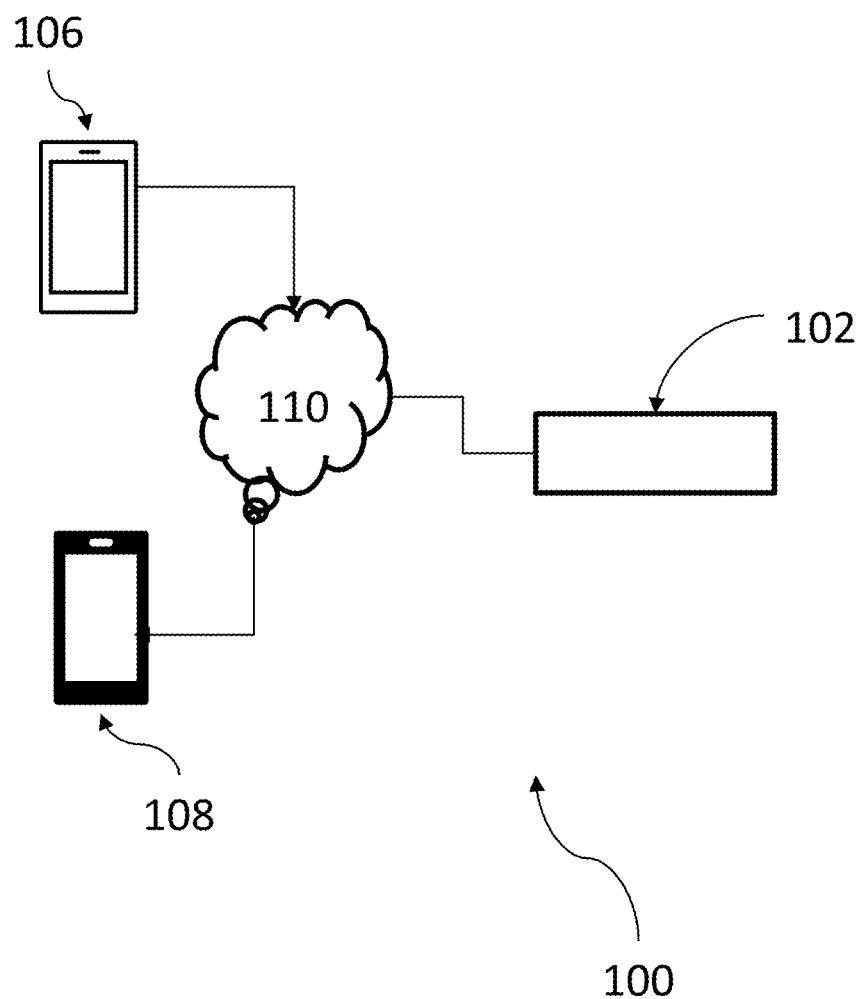
FIG. 1 is a block diagram illustrating an example call processing system according to embodiments of the present invention.

FIG. 1 illustrates an example call processing system 100 according to embodiments of the present invention. The call processing system 100 is implemented within a telecommunications network and comprises at least one processor 102 and a memory 104 storing executable instructions. The processor 102, when executing the instructions stored in memory 104, performs the functional operations described herein for controlling unsolicited telephone calls.

The call processing system 102 is further operatively coupled with a called-party device 106, which may be a mobile handset, fixed-line terminal, or any communication endpoint capable of receiving calls within the network. A calling party device 108, such as a mobile handset, VOIP client, or enterprise telephony system, initiates a call request directed to the called-party device 106. The calling party device 108 and the called party device 106 are communicably connected to the processor 102 through one or more data communication networks 110.

The call request from the calling party device 108 includes an originating telephone number that uniquely identifies the calling party device 108 within the telecommunications network. The originating telephone number is treated by the processor 102 as the identifier against which provisional charging is applied, while the actual signalling initiation is performed by the calling party device 108. The call request is transmitted to the processor 102 for further handling.

In certain embodiments, the call processing system 100 is embodied as a mobile switching center (MSC), a session initiation protocol (SIP) server, or another call control element deployed within a carrier's telecommunications network. In alternative embodiments, the call processing system 100 is realized within an IP Multimedia Subsystem (IMS) core, a Voice-over-LTE (VoLTE) application server, or an equivalent control platform implemented on virtualized network infrastructure.

The processor 102 may be embodied as a general-purpose microprocessor, a digital signal processor (DSP), a network processor, or a system-on-chip (SoC) element integrated within the call processing system 100. In certain embodiments, the processor 102 comprises multiple cores or a distributed processing environment operative to support concurrent execution of call control logic and billing logic. The memory 104 may comprise non-transitory computer-readable media such as random access memory (RAM), read-only memory (ROM), flash memory, or other persistent storage configured to retain the executable instructions. When the processor 102 executes the stored instructions, the processor performs both call-handling operations (including receiving call requests, determining contact list status, transmitting pre-connection notifications, and connecting calls) and billing-related operations (including provisional authorization of charges, receipt of called-party instructions, and finalization or waiver of charges).

In certain embodiments, the billing-related operations are performed entirely by processor 102 as an integrated function of the call processing system 100. In alternative embodiments, the processor 102 invokes an external billing module, such as an online charging system (OCS) or an offline charging system, through standardized charging interfaces defined by carrier infrastructure. In either case, the processor 102 remains the controlling element operative to coordinate the sequence of call authorization, call connection, and charge disposition such that all functions necessary to implement the present invention are executed under the control of the call processing system 100.

The called-party device 106 includes at least one user interface, such as a display, keypad, touchscreen, or speaker-microphone combination, through which prompts may be presented and responses entered by the called party.

In one embodiment, the called-party device 106 executes a lightweight application or signalling client configured to receive command instructions from the processor 102 and to return user inputs as structured signalling messages. In alternative embodiments, the prompting and input may be conducted via interactive voice response (IVR) menus or dual-tone multi-frequency (DTMF) signals without requiring a dedicated application.

The processor 102 is configured to receive a call request initiated by a calling party device 108. The call request is directed toward a called-party device 106 and includes an originating telephone number that identifies the calling party device 108, along with a destination telephone number that identifies the called-party device 106.

In one embodiment, the call request is transmitted over a signalling network using a circuit-switched protocol, such as an Initial Address Message (IAM) within an SS7/ISUP signalling system. In another embodiment, the call request is transmitted using an IP-based protocol, such as a Session Initiation Protocol (SIP) INVITE message, where the originating telephone number is included in a "From" header and the destination telephone number is included in a "To" header. Other signalling formats, including H.323 or proprietary carrier signalling formats, may also be used.

The processor 102 may include one or more network interfaces for receiving such call requests and a signalling parser for extracting the originating and destination telephone numbers.

Upon receiving the call request, the processor 102 recognizes the originating telephone number as the identifier used for subsequent charging and control operations. The destination telephone number is resolved to the called-party device 106 using network routing databases such as a home subscriber server (HSS), visitor location register (VLR), or equivalent subscriber registry.

The processor 102 is further configured to determine whether the originating telephone number included in the received call request is stored in a contact list associated with the called-party device 106. The contact list may be stored locally on the called-party device 106, in a network-based repository, or in a cloud synchronization service maintained by the carrier or a third party.

In one embodiment, the processor 102 transmits a query to the called-party device 106 at the time of receiving the call request. The called-party device 106 may return a binary response indicating whether the originating telephone number is present in the locally stored contact list. In another embodiment, the contact list is synchronized with a network database, such as a carrier-managed address book server or subscriber data management platform. In this case, the processor 102 performs a lookup directly in the network database to determine the presence or absence of the originating telephone number.

The determination may be performed using exact number matching or, in alternative embodiments, using pattern-based matching to account for international dialling prefixes, number normalization rules, or alias entries. The processor 102 may also support matching against multiple identifiers associated with the called-party device 106, such as primary numbers, secondary numbers, or group contacts.

If the originating telephone number is determined not to be stored in the contact list, the processor 102 classifies the call as originating from an unknown number.

The processor 102 is configured to transmit a pre-connection notification to the originating telephone number when the call has been classified as originating from an unknown number. The pre-connection notification informs the calling party that completion of the requested call may be subject to a monetary charge.

In one embodiment, the notification is delivered using signalling messages that precede call setup. For example, in an SS7 environment, the processor 102 may transmit an Announcement message (ANM) or trigger an Early Media announcement to the calling party device 108. In SIP-based embodiments, the notification may be embedded in a 180 Ringing response with an early media session, or transmitted as a pre-call INFO message containing textual or audio information about the potential charge.

In some embodiments, the pre-connection notification may be rendered as an audible prompt, such as a voice announcement stating: "This call may incur a charge if completed." In alternative embodiments, the notification may be a visual indicator presented on the calling party device 108, for example, through a text banner, a pop-up dialog generated by a carrier-integrated application, or a push notification received by the device prior to call connection.

The processor 102 may also transmit metadata enabling the calling party device 108 to display the notification in a standardized form. Such metadata may be conveyed through supplementary service codes, custom SIP headers, or carrier-specific signalling extensions.

In one variation, the processor 102 may require the calling party device 108 to return an explicit response acknowledging or rejecting the potential charge before the call can proceed. If the originating telephone number rejects the charge, the processor 102 terminates the request without establishing a connection. If the originating telephone number accepts the potential charge, subsequent charging and call completion steps are initiated.

The pre-connection notification ensures that the originating party is made aware of the potential financial consequence of proceeding with the call, thereby discouraging nuisance callers from indiscriminately initiating calls to subscribers who have not added them to their contact lists.

The processor 102 is configured to provisionally authorize a charge against the originating telephone number when an acceptance of the potential charge is received from the calling party device 108. The provisional authorization step ensures that sufficient billing capacity exists before the call is connected, while still allowing the charge to be voided later if waived by the called party.

In one embodiment, the processor 102 is configured to perform online charging operations within the carrier network. Upon receiving acceptance of the pre-connection notification, the processor 102 generates a credit control request and reserves an amount of credit or balance associated with the originating telephone number, marking it as a provisional authorization. If the balance is insufficient, the processor 102 rejects the authorization and terminates the call setup process.

In another embodiment, the processor 102 provisionally authorizes charges by recording an authorization entry associated with the originating telephone number for pending settlement. In postpaid environments, the processor 102 records the authorization in a transaction log without immediate balance reservation, whereas in prepaid environments, the processor 102 decrements available credit and maintains the decrement in a suspended state until final confirmation or waiver is received from the called party 106.

In some variations, the processor 102 provisionally authorizes different types of charges depending on network policy. For example, a base charge may be provisionally reserved at the start of the call, while escalated penalties may be provisionally reserved if the originating telephone number has been identified as a repeat offender in a database maintained by the processor 102. The use of such a database allows the processor 102 to differentiate between first-time unsolicited calls and repeated nuisance activity, thereby strengthening deterrence mechanisms.

The processor 102 may further implement provisional authorization using standard charging interfaces such as the Diameter Credit-Control Application (DCCA) in IP-based networks, CAMEL Application Part (CAP) signalling in GSM networks, or proprietary application programming interfaces (APIs) used in carrier billing platforms. In this manner, the processor 102 ensures compatibility with existing network infrastructures while enabling the enhanced provisional authorization functions described herein.

Through provisional authorization, the processor 102 creates a transactional placeholder that permits the call to proceed only after the originating party has accepted the potential charge, while deferring final settlement until after the called party's input has been obtained.

The processor 102 is further configured to establish a communication path between the calling party device 108 and the called-party device 106 once provisional authorization has been successfully executed. This ensures that call completion is contingent upon both the caller's acceptance of the potential charge and the processor's confirmation that provisional billing has been secured.

In one embodiment, the processor 102 transitions the signalling state from a pending or provisional state into an active call state upon execution of a successful provisional authorization associated with the originating telephone number. In a circuit-switched environment, the processor 102 may transmit an Address Complete Message (ACM) followed by an Answer Message (ANM) in SS7/ISUP signalling to establish the bearer channel between the originating and destination endpoints. In an IP-based environment, such as SIP/IMS, the processor 102 may forward a 200 OK response to the INVITE request, completing the SIP dialog and initiating media session establishment between the calling party device 108 and the called-party device 106.

In another embodiment, the processor 102 may integrate with a media gateway or session border controller (SBC) to facilitate bearer channel establishment once authorization has been received. The processor 102 controls the gateway resources to allocate bandwidth and initiate RTP session parameters necessary for voice communication between the endpoints.

The processor 102 may further incorporate logic to terminate the call request if provisional authorization is not received within a predetermined interval, thereby preventing unauthorized call completions. In this case, the caller may receive an announcement or rejection message indicating that the call could not be completed.

In yet another embodiment, the processor 102 applies conditional routing policies during connection. For example, if the originating telephone number has been marked as a repeat offender, the call may be routed through a monitored media path, recorded for audit, or subjected to a higher initial penalty charge before full connection is allowed.

Through this mechanism, the processor 102 ensures that call connection occurs only after the financial prerequisite of provisional authorization has been satisfied, while also allowing policy-based control over how calls from certain categories of callers are handled at connection time.

The processor 102 is further configured to trigger presentation of a prompt on the called-party device 106 after termination of a connected call. The prompt requests input from the called party regarding whether the provisionally authorized charge applied to the originating telephone number should be confirmed or waived.

In one embodiment, upon detecting call termination, the processor 102 transmits a control signal to the called-party device 106. The control signal may be carried over standard signalling channels, an application-level protocol, or a dedicated carrier-controlled channel. The called-party device 106, in response, renders the prompt via its user interface. The user interface may include a graphical display, a touchscreen, or a keypad through which the called party can select confirmation or waiver. In some implementations, the graphical prompt is delivered through a carrier-provisioned application residing on the called-party device 106, while in other implementations, the notification is presented through the native operating system interface by means of a push messaging protocol.

In another embodiment, the prompt is delivered as an interactive voice response (IVR) menu initiated immediately after call termination. The called party device 106 is prompted through an automated voice announcement and may respond using dual-tone multi-frequency (DTMF) input or speech recognition.

In a further embodiment, the processor 102 may deliver the prompt as a push notification through a carrier-integrated application installed on the called-party device 106. The push notification may provide options to confirm or waive the charge, with the response transmitted back to the processor 102 through a secure application programming interface (API).

The timing of prompt presentation may also vary. In some configurations, the prompt appears immediately after call termination, ensuring real-time decision-making by the called party. In other configurations, the prompt may be queued and delivered later, for example as part of a notification system that allows the called party to review multiple call events and decide on the status of each provisional charge at a convenient time.

The presentation of the prompt ensures that the called party retains ultimate control over whether the provisional charge is enforced, thus distinguishing the system from prior approaches where only the calling party's acceptance determined billing outcomes. This mechanism balances deterrence of nuisance callers with fairness to legitimate callers who may be contacting the subscriber for valid reasons.

The processor 102 is further configured to receive an instruction from the called-party device 106 after presentation of the prompt. The instruction indicates whether the provisionally authorized charge associated with the originating telephone number should be confirmed or waived.

In one embodiment, the called-party device 106 generates the instruction as a structured signalling message transmitted directly to the processor 102. The message may be conveyed using existing signalling channels, such as supplementary service codes in SS7, or as a SIP INFO message in IP-based networks. In another embodiment, the called-party device 106 transmits the instruction through an application-layer channel, for example via a carrier-provided application that communicates with the processor 102 using a secure application programming interface (API).

The instruction may be represented as a binary decision value, such as a confirm flag or waive flag, which the processor 102 interprets and processes further. In alternative embodiments, the instruction may include additional metadata, such as a timestamp of the decision, a session identifier for the terminated call, or security credentials authenticating the called party's input.

In an embodiment, the processor 102 enforces a SIM binding mechanism to ensure the authenticity of waiver or confirmation instructions transmitted from the called-party device 106. SIM binding ensures that the instruction originates from the correct subscriber device associated with the destination telephone number, thereby preventing fraud or spoofing attacks. SIM binding is accomplished by comparing the SIM identifier (such as the IMSI or ICCID) embedded in the instruction message with the subscriber record maintained in the carrier's authentication database. If the SIM identifier matches the expected record for the destination telephone number, the instruction is accepted as valid. If the SIM identifier does not match, the instruction is rejected and the system applies a default policy, such as automatic confirmation of the provisional charge. In another embodiment, SIM binding may be augmented with device-level identifiers (e.g., IMEI numbers, cryptographic device certificates, or hardware attestation tokens) to provide multifactor assurance that the instruction originates from the authentic called-party device 106. In further embodiments, SIM binding may be enforced through secure communication channels, such as application-layer encryption with carrier-issued certificates, thereby preventing interception or manipulation of waiver instructions.

In another embodiment, the processor 102 further comprises a timeout controller that enforces a predetermined period within which the called party device 106 must provide an instruction indicating whether a provisional charge is to be confirmed or waived. If the timeout interval expires without receipt of the instruction, the timeout controller applies a default resolution policy. In one embodiment, the default is to confirm the provisional charge, thereby ensuring that nuisance callers cannot exploit non-response conditions to avoid penalty. In another embodiment, the default is to waive the provisional charge, thereby prioritizing subscriber convenience in the absence of explicit input. In further embodiments, the timeout policy may be configurable on a per-subscriber or per-carrier basis, allowing the operator to determine whether confirmation or waiver is the default treatment under timeout conditions.

The timeout controller may be implemented as a software timer routine within the processor 102, as a state machine, or as a distributed timer service that synchronizes across multiple network elements.

Through this mechanism, the processor 102 enables secure and reliable collection of the called party's decision, ensuring that the provisional charge is handled in accordance with subscriber input while maintaining integrity of the billing process.

The processor 102 is configured to process the provisionally authorized charge once an instruction is received from the called-party device 106. The instruction originates from the called-party device 106 and specifies whether the provisional charge should be confirmed or waived.

In one embodiment, when the instruction indicates confirmation, the processor 102 finalizes the charge by moving the transaction from provisional status to settled status. In a prepaid environment, this may involve deducting the reserved balance from the originating party's prepaid account and releasing the hold. In a postpaid environment, this may involve recording the charge in the subscriber's call detail record (CDR) for later billing in the monthly invoice.

When the instruction indicates waiver, the processor 102 voids the provisional authorization. In prepaid environments, the reserved credit is restored to the originating party's account balance. In postpaid environments, the provisional charge entry is cancelled or marked as non-billable. The voiding process ensures that legitimate callers or contacts mistakenly treated as unknown are not unfairly penalized.

The processor 102 may also support policy-based automation for processing provisional charges. For example, if no instruction is received within a specified timeout period, the processor 102 applies a default action, either finalizing or voiding the charge depending on carrier configuration. The processor 102 may additionally log all processing outcomes for audit purposes, fraud detection, and customer support queries.

In an aspect of the present invention, when the calling party device 108 initiates a call request toward the called-party device 106, the request is received at the processor 102. The call request includes the originating telephone number identifying the calling party device 108 and the destination telephone number identifying the called-party device 106. The processor 102 parses the signalling and extracts these identifiers for subsequent processing.

The processor 102 then determines whether the originating telephone number is present in a contact list associated with the called-party device 106. If the originating telephone number is found in the contact list, the call is processed normally. If the originating telephone number is not found, the processor 102 transmits a pre-connection notification to the calling party device 108. The notification indicates that completion of the call may be subject to a charge. The notification may be delivered as an audible announcement, an on-screen message, or signalling metadata interpretable by the calling party device 108.

The calling party device 108 responds to the notification by either accepting or rejecting the potential charge. If the calling party rejects, the processor 102 terminates the request. If the calling party accepts, the processor 102 provisionally authorizes a charge associated with the originating telephone number. The processor 102 temporarily reserves an amount of credit or balance associated with the originating telephone number, thereby ensuring that sufficient funds or credit capacity exist to satisfy the potential charge before the call is allowed to proceed.

Upon receipt of provisional authorization, the call processor 102 establishes a communication path between the calling party device 108 and the called-party device 106. The call is then conducted in a standard manner until one or both parties terminate the session.

Following termination of the call, the processor 102 triggers the called-party device 106 to present a post-call prompt requesting input from the called party regarding the provisional charge. The prompt may appear as a graphical dialog, a keypad-based option, an IVR menu, or a push notification, depending on device capability and carrier configuration.

The called party enters an instruction through the called-party device 106, selecting either to confirm or waive the charge. This instruction is transmitted back to the processor 102 which then processes the instruction by either finalizing the charge (in the case of confirmation) or voiding the charge (in the case of waiver). In prepaid accounts, this may involve settling or restoring reserved credit, while in postpaid accounts, it may involve finalizing or cancelling a billing record.

In another embodiment, the processor 102 further comprises a repeat-offender database configured to maintain historical information relating to the treatment of provisional charges associated with originating telephone numbers. The repeat-offender database provides a persistent record of whether prior calls from a given originating telephone number resulted in a confirmed charge or a waiver, thereby enabling the system to distinguish between nuisance callers and legitimate contacts.

The repeat-offender database may be realized in multiple architectural configurations. In one embodiment, the database is integrated within the memory 104 of the call processing system 100. In this arrangement, the processor 102 records the outcome of each provisional charge directly into the repeat-offender database as part of its charge-processing logic. The stored information may include the originating telephone number, timestamps of prior call events, the decision of the called party (confirmation or waiver), and penalty levels applied. By maintaining the repeat-offender database locally under the control of the processor 102, escalated penalties can be applied during provisional authorization and finalization steps without requiring external communication.

In another embodiment, the repeat-offender database is maintained as a logically distinct datastore accessible to the processor 102 through an authenticated interface. In this configuration, the processor 102 stores the historical outcomes of call events and applies this information in real time to incoming call requests. For example, if a call request is received from an originating telephone number identified in the database as a repeat offender, the processor 102 may escalate the penalty, generate additional warnings, or terminate the call request immediately. This embodiment enables faster enforcement at the network edge by reducing lookup latency and allowing the processor 102 to enforce policies without invoking external systems.

In yet another embodiment, the repeat-offender database is implemented as a standalone datastore that is communicatively coupled to the processor 102 through the data communication network 110. In this configuration, the processor 102 updates the datastore with post-call outcomes and queries the datastore in real time to determine whether an originating telephone number has been previously identified as a nuisance caller. The repeat-offender database may be realized as a centralized relational database, a distributed key-value store, or a replicated graph database capable of linking multiple telephone numbers to a single caller identity. In some implementations, the processor 102 maintains a local cache synchronized with the repeat-offender database to minimize latency while preserving consistency with centralized policy.

The repeat-offender database enables the application of escalated penalties to persistent nuisance callers. In one embodiment, the processor 102 incrementally increases monetary charges with each successive confirmed call from the same originating telephone number. In another embodiment, escalation may be tiered, such that once a caller exceeds a defined threshold of confirmed charges, all subsequent calls are subject to a higher penalty rate until the offender status is cleared. In addition to monetary escalation, the processor 102 may impose non-monetary deterrents, including increased call setup delays, mandatory warning announcements, or routing through monitored or restricted channels. The escalation mechanism may also be adaptive, taking into account the frequency, duration, and timing of prior calls.

Optionally, the repeat-offender database also supports adaptive bypass logic for trusted callers. If a particular originating telephone number has been consistently waived by the called party over multiple interactions, the processor 102 may conclude that the number represents a legitimate caller rather than a nuisance source. In such cases, the processor 102 may bypass the transmission of a pre-connection notification for future calls from that number, allowing the call to proceed without provisional charging. Adaptive bypass may be temporary, with the system periodically reintroducing the notification requirement, or permanent until the called party alters their preferences.

In some embodiments, the repeat-offender database incorporates grouping logic that allows two or more originating telephone numbers to be associated with a common caller identity. This feature prevents nuisance callers from evading penalties or gaining bypass privileges simply by rotating among different numbers.

The grouping may be established through multiple mechanisms. In one embodiment, grouping is based on subscription-level information, where multiple numbers belong to a single carrier account. For example, corporate telemarketers or call centres often control multiple lines; by associating all of those numbers with a single account, the system ensures that penalties or waivers applied to one line extend across the group.

In another embodiment, grouping may be based on device identifiers, such as SIM identifiers, International Mobile Equipment Identity (IMEI) numbers, or other device fingerprints. If the system detects that multiple originating telephone numbers are being used from the same physical device or SIM module, those numbers may be automatically grouped together for enforcement purposes.

In some embodiments, grouping of two or more originating telephone numbers under a common caller identity is performed by a learning-based model that infers associations without relying on fixed rule sets. The model may be deployed within the processor 102, and is configured to receive event data associated with call requests and charging outcomes. Training inputs may include, by way of example, features derived from signalling events (e.g., inter-call intervals, burstiness, destination dispersion, diurnal patterns), device- or SIM-related attributes when available, geolocation granularity at a carrier-permitted resolution, historical counts of confirmations and waivers, and prior group assignments stored in the repeat-offender database.

In one embodiment, the learning-based model is implemented as a supervised classifier trained on historic labels of common caller identity that were established by prior investigations or heuristic signals. In another embodiment, the learning-based model is unsupervised, for example using clustering or graph-community detection over a similarity graph whose nodes represent originating telephone numbers and whose edges encode learned affinities derived from calling behaviour. In yet another embodiment, a hybrid approach is employed in which a supervised model scores pairwise (or groupwise) association likelihoods and an unsupervised algorithm consolidates numbers into stable groups subject to minimum-confidence thresholds.

The learning-based model produces a grouping decision or association score indicating the likelihood that two or more originating telephone numbers correspond to a common caller identity. The decision may be threshold according to carrier policy, optionally requiring a confidence level or consensus across multiple model snapshots. Where the grouping inference affects enforcement (e.g., penalty escalation or adaptive bypass), the processor 102 may require a higher confidence threshold, a cool-off period, or human-in-the-loop validation before applying group-wide changes to penalties or notification behaviour. The resulting group assignment is written to the repeat-offender database and used by the processor 102 to inform subsequent call handling.

In some implementations, the learning-based model supports online updates, allowing model parameters to be refined continuously as new call events and charge outcomes are recorded. In other implementations, the learning-based model is updated periodically and deployed as a signed model artifact to the processor 102 and/or the independent datastore, with versioning to ensure reproducibility of past grouping decisions. To ensure reliability, the processor 102 may retain explanatory signals (e.g., top contributing features or exemplar events) linked to each grouping decision, enabling audit and rollback if a grouping is later determined to be erroneous.

The learning-based model may be configured with safety constraints that cap the rate of penalty escalation triggered solely by new groupings, limit the spread of a group to a maximum number of originating telephone numbers within a defined interval, and enforce privacy and compliance controls over feature usage (for example, excluding personally identifying content and applying coarse regional granularity rather than precise location). If the model or datastore becomes unavailable, the processor 102 applies a default policy (e.g., treat numbers individually) until grouping services resume, thereby preserving continuity of call handling.

By employing a learning-based grouping mechanism alongside rule-based or subscription/SIM-linked techniques, the processor 102 enhances its ability to detect coordinated nuisance activity that rotates among multiple originating telephone numbers, while maintaining explainability, auditability, and policy control suitable for carrier deployment. Once a group has been established, penalty escalation and adaptive bypass decisions apply uniformly across the group. For example, if one number in the group has accumulated repeated confirmed charges, the entire group may be elevated into a higher penalty tier. Conversely, if a number in the group is consistently waived by a subscriber, future calls from other numbers in the same group may benefit from adaptive bypass of the pre-connection notification.

In an alternate embodiment, the called-party device 106 communicates its instruction, indicating whether the provisional charge is to be confirmed or waived through an application programming interface (API) exposed by the processor 102. The use of an API allows the called-party input to be transmitted securely, reliably, and in a format that can be uniformly processed across heterogeneous device environments. In one embodiment, the processor 102 receives the called-party input in form of an API request that includes the originating telephone number, the destination telephone number, a transaction identifier corresponding to the provisional authorization, and the instruction flag indicating confirmation or waiver. The processor 102, upon receiving the API request, reconciles the instruction with the provisional authorization record and finalizes or voids the charge accordingly.

In further embodiments, the API may be realized as a RESTful service, a gRPC endpoint, or a Diameter-based charging interface conforming to existing carrier protocols. The API may enforce authentication tokens, digital signatures, or SIM-based certificates to validate the origin of the instruction. The API response may include acknowledgment codes, error messages in the event of invalid or expired transaction identifiers, and policy feedback indicating whether the instruction has been accepted or overridden by carrier rules.

The waiver decision API may also be integrated with the repeat-offender database. For example, each API call may include a flag indicating whether the instruction was transmitted under timeout control, SIM binding validation, or grouping context. This information may be logged by the processor 102 to refine escalation policies and adaptive bypass determinations.

In certain embodiments, the API framework may further support batch processing or offline reconciliation. For instance, if a called-party device 106 is temporarily disconnected from the network, the device may store the waiver decision locally and transmit the instruction via the API when connectivity is restored. The processor 102 may reconcile the delayed instruction with the provisional charge, applying carrier-defined policies to either honour or disregard late submissions.

Figure 2:
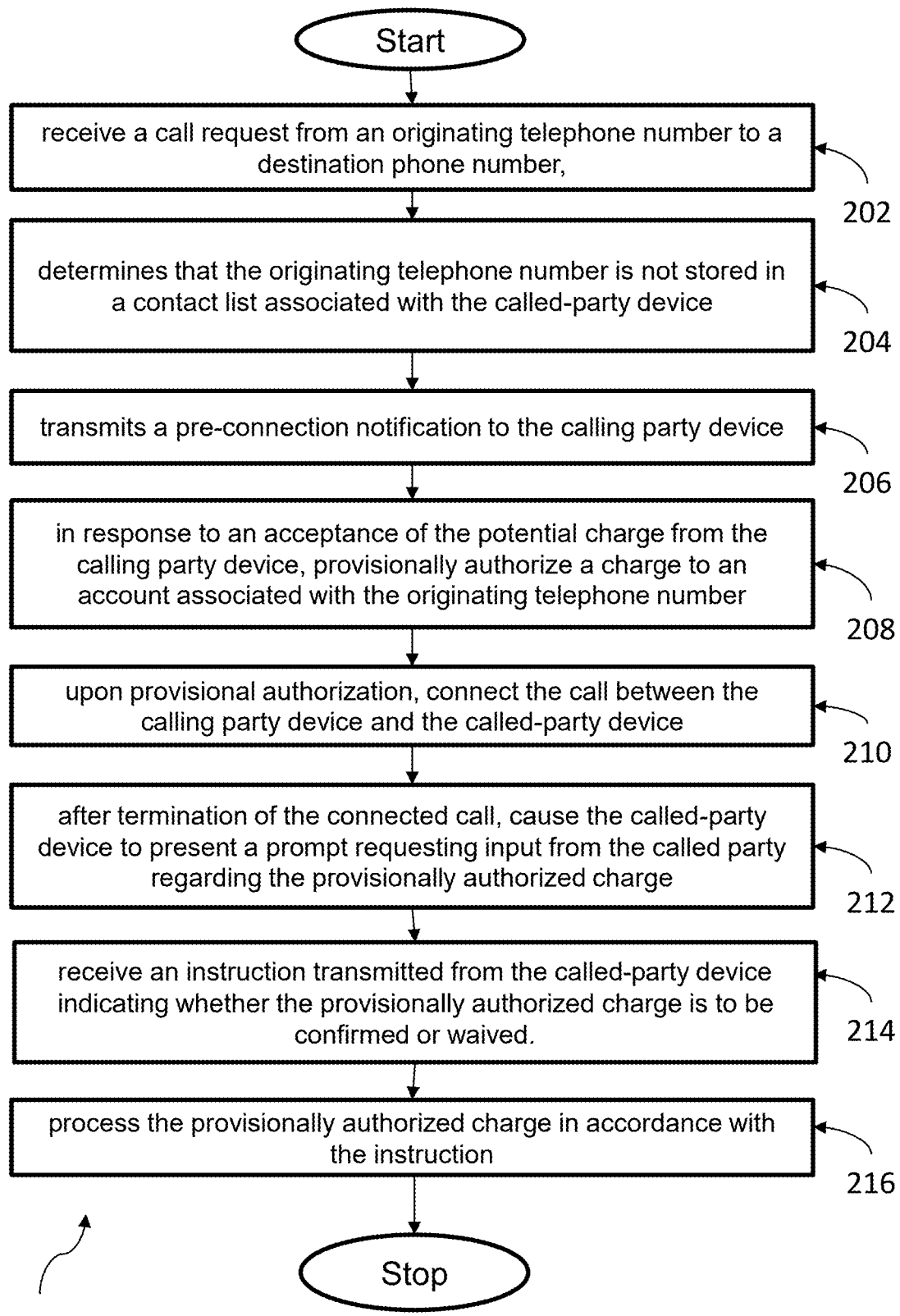
FIG. 2 is a flowchart illustrating an example method for controlling unsolicited telephone calls according to embodiments of the present invention.

Referring now to FIG. 2, there is shown a flowchart of a method 200 for controlling unsolicited calls in a telecommunications network, the method being executed by a processor 102.

At step 202, the processor 102 receives a call request from a calling party device 108 associated with an originating telephone number, the request being directed to a destination telephone number associated with the called-party device 106.

At step 204, the processor 102 determines that the originating telephone number is not stored in a contact list associated with the called-party device 106.

At step 206, the processor 102 transmits a pre-connection notification to the calling party device 108, the notification indicating that completion of the call may be subject to a monetary charge.

At step 208, in response to an acceptance of the potential charge from the calling party device 108, the processor 102 provisionally authorizes a charge to an account associated with the originating telephone number.

At step 210, upon provisional authorization, the processor 102 connects the call between the calling party device 108 and the called-party device 106.

At step 212, after termination of the connected call, the processor 102 causes the called-party device 106 to present a prompt requesting input from the called party regarding the provisionally authorized charge.

At step 214, the processor 102 receives an instruction transmitted from the called-party device 106 indicating whether the provisionally authorized charge is to be confirmed or waived.

At step 216, the processor 102 processes the provisionally authorized charge in accordance with the instruction, finalizing the charge when the instruction indicates confirmation and voiding the charge when the instruction indicates waiver.

The data communication network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of the foregoing.

Any of the software components or functions described in this application may be implemented as software code to be executed by a controller using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

One or more components of the invention are described as unit or modules for the understanding of the specification. For example, a unit may include self-contained component in a hardware circuit comprising of logical gate, semiconductor device, integrated circuits or any other discrete component. The unit may also be a part of any software programme executed by any hardware entity for example processor. The implementation of unit as a software programme may include a set of logical instructions to be executed by a processor or any other hardware entity.

Additional or less units can be included without deviating from the novel art of this disclosure. In addition, each unit can include any number and combination of sub-units, and systems, implemented with any combination of hardware and/or software units.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A method for controlling unsolicited telephone calls in a telecommunications network, the method executed by at least one processor of a call processing system, the method comprising:

receiving, by the processor, a call request for a call from an originating telephone number directed to a destination telephone number associated with a called-party device of a called party;

determining, by the processor, that the originating telephone number is not stored in a contact list associated with the called-party device;

transmitting, by the processor, a pre-connection notification to the originating telephone number indicating that completion of the call may be subject to a charge;

provisionally authorizing, by the processor, a charge to an account associated with the originating telephone number in response to an acceptance of the potential charge from the originating telephone number;

connecting, by the processor, the call between the originating telephone number and the called-party device upon provisional authorization;

after termination of the connected call, causing, by the processor, the called-party device to present a prompt requesting input from the called party regarding the provisionally authorized charge;

receiving, by the processor, an instruction transmitted from the called-party device indicating whether the provisionally authorized charge is to be confirmed or waived; and processing, by the processor, the provisionally authorized charge in accordance with the instruction, including finalizing the charge when the instruction indicates confirmation and voiding the charge when the instruction indicates waiver; and wherein the processor is further configured to apply an increased penalty if the originating telephone number is identified in a repeat-offender database as a repeat offender.

2. The method of claim 1, wherein the processor is further configured to maintain the repeat-offender database storing historical outcomes of instructions indicating confirmation or waiver for originating telephone numbers.

3. The method of claim 1, wherein the processor is further configured to present the prompt wherein presenting the prompt comprises presenting the prompt as one of: a graphical notification on a handset, an interactive voice response menu, or a keypad input request.

4. The method of claim 1, wherein the processor is further configured to terminate the call request in response to receiving, from the originating telephone number, a rejection of the potential charge.

5. The method of claim 1, wherein the processor is further configured to verify the instruction by performing a SIM binding check to ensure that the instruction originates from the called-party device associated with the destination telephone number.

6. The method of claim 1, wherein the processor is further configured to apply a timeout controller such that if the instruction is not received within a predetermined time interval after termination of the call, the processor automatically processes the provisionally authorized charge in accordance with a default policy of either confirming or waiving the charge.

7. The method of claim 1, wherein the processor is further configured to connect subsequent call requests from an originating telephone number without transmitting the pre-connection notification when the originating telephone number has been associated in the repeat-offender database with more than a threshold number of waiver instructions.

8. The method of claim 1, wherein the processor is further configured to associate two or more originating telephone numbers with a common caller identity in the repeat-offender database, and to apply processing of provisionally authorized charges in accordance with the caller identity.

9. A call processing system for controlling unsolicited telephone calls in a telecommunications network, the call processing system comprising:

at least one processor; and a memory storing instructions that, when executed by the at least one processor, cause the call processing system to:

receive a call request for a call from an originating telephone number directed to a destination telephone number associated with a called-party device of a called party;

determine that the originating telephone number is not stored in a contact list associated with the called-party device;

transmit a pre-connection notification to the originating telephone number indicating that completion of the call may be subject to a charge;

provisionally authorize a charge to an account associated with the originating telephone number in response to an acceptance of the potential charge from the originating telephone number;

connect the call between the originating telephone number and the called-party device upon provisional authorization;

after termination of the connected call, trigger presentation of a prompt on the called-party device requesting an instruction from the called party regarding disposition of the provisionally authorized charge;

receive, from the called-party device, the instruction indicating whether the provisionally authorized charge is to be confirmed or waived; and process the provisionally authorized charge in accordance with the instruction, including finalizing the charge when the instruction indicates confirmation and voiding the charge when the instruction indicates waiver; and apply an increased penalty if the originating telephone number is identified in a repeat-offender database as a repeat offender.

10. The call processing system of claim 9, further comprising the-repeat-offender datastore communicatively coupled to the processor, wherein the processor is configured to obtain a caller status from the repeat-offender datastore and to record post-call outcomes in the repeat-offender datastore.

11. The call processing system of claim 9, wherein the processor is further configured to maintain the repeat-offender database storing historical outcomes of instructions indicating confirmation or waiver for originating telephone numbers.

12. The call processing system of claim 9, wherein the processor is further configured to trigger presentation of the prompt on the called-party device as one of: a graphical notification on a handset, an interactive voice response menu, or a keypad input request.

13. The call processing system of claim 9, wherein the processor is further configured to terminate the call request in response to receiving, from the originating telephone number, a rejection of the potential charge.

14. The call processing system of claim 9, wherein the processor is further configured to verify the instruction by performing a SIM binding check to ensure that the instruction originates from the called-party device associated with the destination telephone number.

15. The call processing system of claim 9, wherein the processor is further configured to apply a timeout controller such that if the instruction is not received within a predetermined time interval after termination of the call, the call processing system automatically processes the provisionally authorized charge in accordance with a default policy of either confirming or waiving the charge.

16. The call processing system of claim 9, wherein the processor is further configured to connect subsequent call requests from an originating telephone number without transmitting the pre-connection notification when the originating telephone number has been associated in the repeat-offender database with more than a threshold number of waiver instructions.

17. The call processing system of claim 9, wherein the processor is further configured to associate two or more originating telephone numbers with a common caller identity in the repeat-offender database, and to apply processing of provisionally authorized charges in accordance with the caller identity.

* * * * *